(12) United States Patent  
Siler, III et al.

(10) Patent No.: US 7,845,883 B1
(45) Date of Patent: Dec. 7, 2010

(54) METHOD FOR REMEDIATION OF CONTAMINATED SUBSURFACE AREA

(75) Inventors: Joel M. Siler, III, Enid, OK (US); Deanna R. Atkinson, Enid, OK (US)

(73) Assignee: Oklahoma Environmental, Inc., Enid, OK (US)

( * ) Notice: Subject to any disclaimer, the term of this patent is extended or adjusted under 35 U.S.C. 154(b) by 378 days.

(21) Appl. No.: 12/013,251

(22) Filed: Jan. 11, 2008

(51) Int. Cl.
*B09C 1/00* (2006.01)

(52) U.S. Cl. ............... 405/258.1; 166/77.1; 166/270.1

(58) Field of Classification Search ... 405/128.1–128.3, 405/258.1, 263; 166/368, 77.1, 92.1, 93.1, 166/94.1, 97.1, 75.13, 270.1
See application file for complete search history.

(56) References Cited

U.S. PATENT DOCUMENTS

| | | | | |
|---|---|---|---|---|
| 5,037,240 A | * | 8/1991 | Sherman ............... | 405/128.15 |
| 5,050,676 A | | 9/1991 | Hess et al. | |
| 5,161,914 A | * | 11/1992 | Rahn et al. ............. | 405/128.2 |
| 5,172,764 A | | 12/1992 | Hajali et al. | |
| 5,197,541 A | | 3/1993 | Hess et al. | |
| 5,358,357 A | | 10/1994 | Mancini et al. | |
| 5,389,267 A | * | 2/1995 | Gorelick et al. ........... | 210/758 |
| 5,400,858 A | | 3/1995 | Blanchard et al. | |
| 5,415,777 A | * | 5/1995 | Krempen et al. ......... | 435/262.5 |
| 5,441,365 A | | 8/1995 | Duffney et al. | |
| 5,452,765 A | | 9/1995 | Blanchard et al. | |
| 5,611,642 A | * | 3/1997 | Wilson .................. | 405/128.45 |
| 5,765,964 A | * | 6/1998 | Calcote et al. ......... | 405/128.55 |
| 5,888,021 A | * | 3/1999 | Kawabata .............. | 405/128.45 |
| 6,158,924 A | * | 12/2000 | Athens et al. .......... | 405/128.25 |
| 2003/0165358 A1 | * | 9/2003 | Brown et al. ............. | 405/128.5 |

OTHER PUBLICATIONS

William B. Winkley, et al, "Surfactant Enhanced Aquifer Remediation Technology for LNAPL Mitigation", magazine article, Jul./Aug. 1998.

* cited by examiner

*Primary Examiner*—Tara Mayo-Pinnock
(74) *Attorney, Agent, or Firm*—Tomlinson Rust McKinstry Grable

(57) ABSTRACT

A method and system for remediation of a contaminated subsurface area. The method comprises an infiltration operation in which a surfactant containing a fluorescent dye is injected to various depths in the contaminated area. The surfactant dye may be injected using a gravity feed process or pressure injection. Soil samples are taken at various distances from the injection point. The soil samples are analyzed to determine the radius of influence of the surfactant. Flow rates, flow volumes, and flow paths of the surfactant are determined from the soil samples. A remediation surfactant is injected to encapsulate liquid hydrocarbons in the contaminated area. The contaminant is then extracted from the area using a vacuum extraction system. The extraction system comprises flexible tubing inserted through a port in a well-head cap. The tubing is inserted to an appropriate depth to maintain a predetermined vacuum pressure.

16 Claims, 3 Drawing Sheets

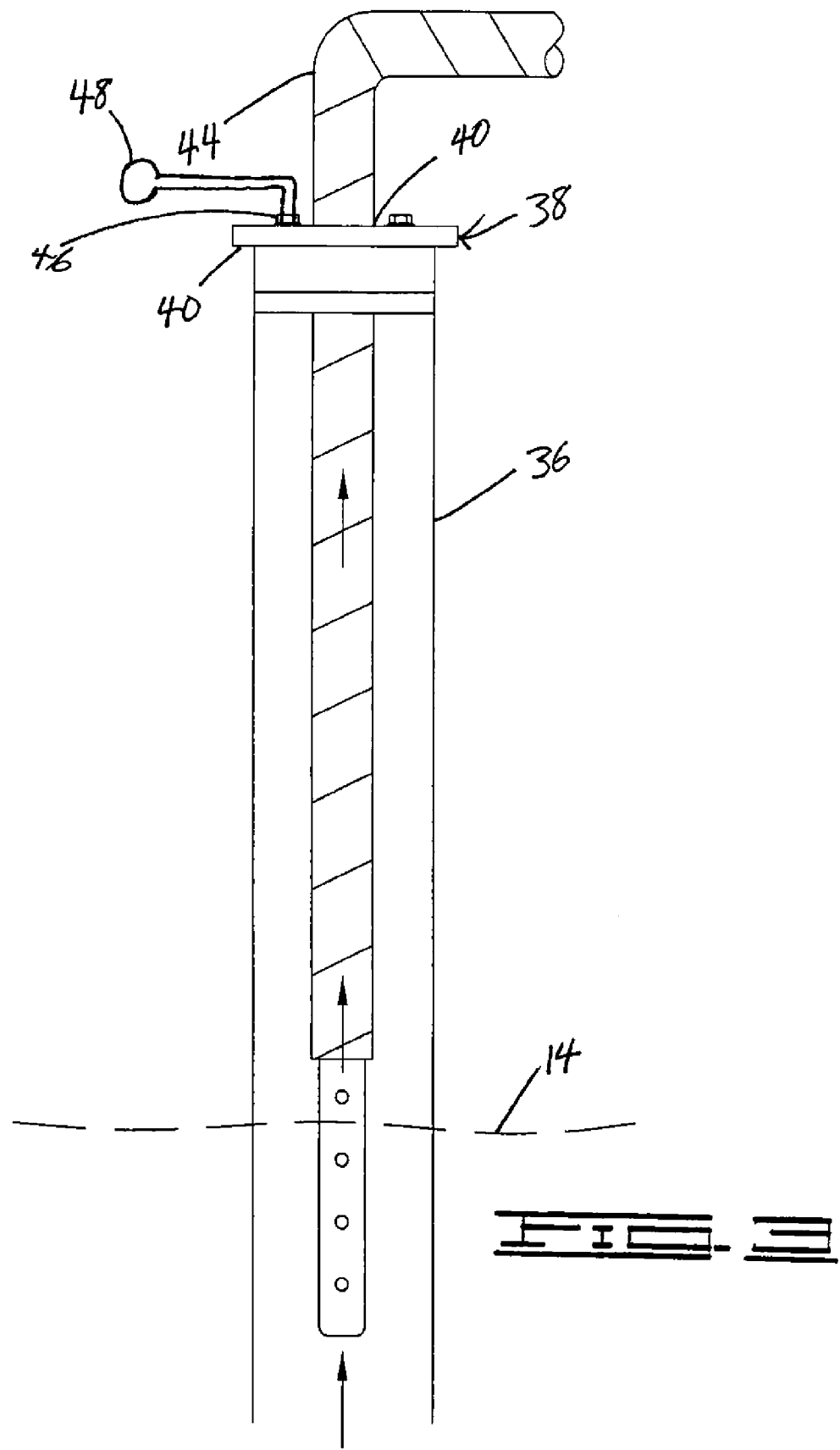

METHOD FOR REMEDIATION OF CONTAMINATED SUBSURFACE AREA

FIELD OF THE INVENTION

The present invention relates generally to the field of remediation of contaminated soil and groundwater, and in particular to a method and system for analyzing contamination in an area and subsequently initiate in situ surfactant washing followed by mobile dual-phase high vacuum extraction of soil and groundwater.

SUMMARY OF THE INVENTION

The present invention is directed to a method for remediation of a contaminated subsurface area. The method comprises injecting an infiltration test surfactant at least one infiltration location in a contaminated area, obtaining a plurality of soil samples from a plurality of locations in the contaminated area, analyzing the plurality of soil samples for the presence of the injected surfactant, determining a radius of influence of the injected surfactant, injecting a remediation surfactant into the contaminated area based on the determined radius of influence, and extracting a contaminant from the contaminated area using a vacuum extraction system.

In an alternative embodiment, the present invention is directed to a method for remediation of a contaminated subsurface area. The method comprises injecting a remediation surfactant into the contaminated area, installing a well-head cap seal on a recovery well, extracting a contaminant from the contaminated area using a vacuum extraction system, and moving the tubing to another predetermined depth in the well to maintain a vacuum pressure within a predetermined range. The well-head cap seal comprises a cap defining a port and adapted to be secured to the well, and a tubing adapted to be inserted through the port, wherein the tubing is adapted to be inserted to a predetermined depth in the well when the cap is secured to the well. The vacuum extraction system comprises a holding tank, a pump, and at least one hose connected to the holding tank and adapted to be connectable to the tubing of the well-head cap seal.

In yet another aspect the present invention is directed to a well-head cap seal for use with a vacuum extraction system. The seal comprises a cap adapted to secure to a well-head, the cap defining a port, and a tubing adapted to be inserted through the port, the tubing connectable to a vacuum extraction system. The tubing is adapted to be inserted to a predetermined depth in a well when the cap is secured to the well-head.

BRIEF DESCRIPTION OF THE DRAWINGS

FIG. 3 is a partial elevation view of a well and well-head cap assembly for use with the extraction system of FIG. 2.

DESCRIPTION OF THE INVENTION

Figure 1:
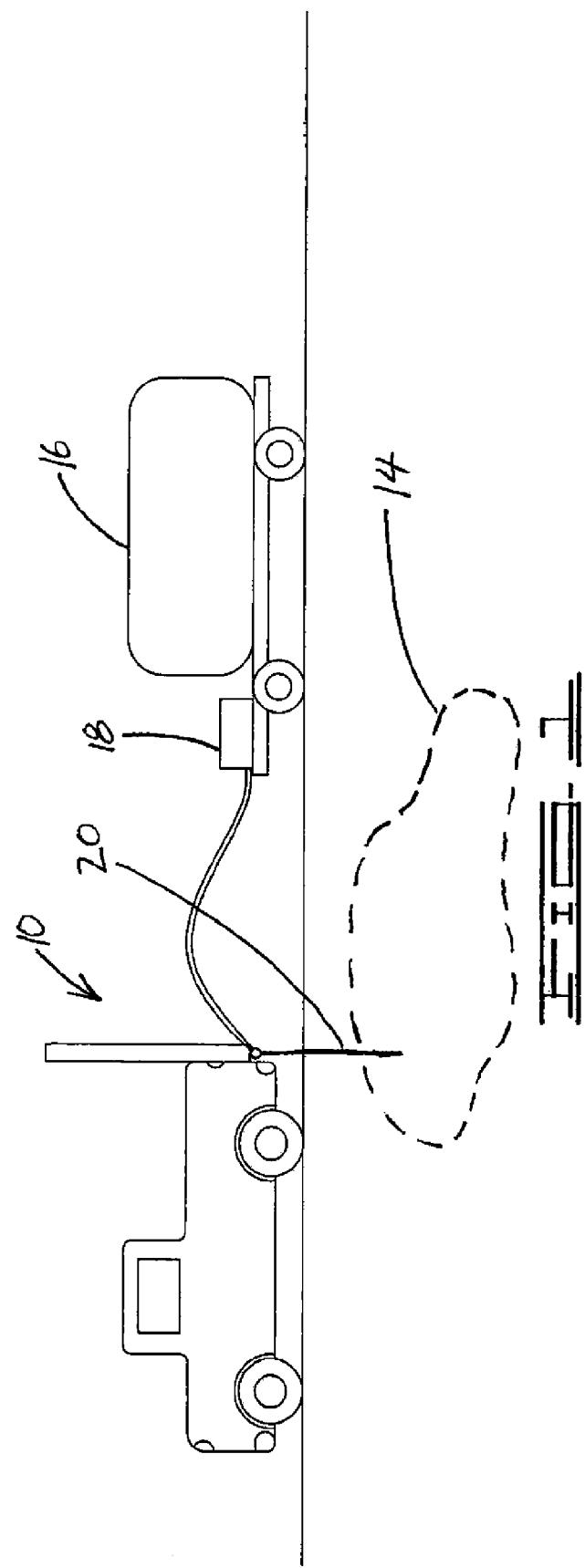
FIG. 1 is a graphic representation of an injection system for use in an infiltration operation in accordance with the present invention.

With reference now to the drawings and to FIG. 1 in particular, there is shown therein a representation of a planned infiltration operation in accordance with the present invention. FIG. 1 illustrates use of an injection system 10 for injecting an infiltration test surfactant in an impacted or contaminated area 14. Generally, the contaminated area 14 is a subsurface site where refined petroleum hydrocarbons have impacted soil and groundwater resulting in a contaminant. The purpose of the infiltration operation is to identify and examine possible geologic and hydrologic variables influencing fluid flow in the contaminated area 14. These variables may include different lithologies, soil types, grain sizes, and fluid saturations. Preferably, the identification of fluid flow patterns in the subsurface will show possible preferential pathways for contaminant movement. The infiltration test may also indicate zones where fluid flow is restricted yet temporal fluctuations in the water table elevation have allowed contaminant to reside.

In a preferred embodiment, the injection system 10 comprises a holding tank 16, a pump 18, and at least one injection rod 20. The holding tank 16 contains the infiltration test surfactant solution. Preferably the infiltration test surfactant is comprised of a water based biodegradable blended fluid. More preferably, a fluorescein dye is mixed into the infiltration test surfactant. Most preferably, the fluoresceine dye comprises a 1,000 mg/l concentration mixed into a 2% surfactant solution. The infiltration test surfactant is pumped from the holding tank 16 using the pump 18. The pump 18 preferably comprises a small low volume pump to move the surfactant to the at least one injection rod 20.

The at least one injection rod 20 preferably comprises a direct push rod. The at least one direct push rod 20 is disposed at selected locations for dispersing the infiltration test surfactant to the contaminated area 14. Preferably, the rods 20 will have been pushed to predetermined depths in the contaminated area 14. More preferably, the rods 20 will be disposed to at least two depths for the infiltration operation. The direct push rods 20 further have an injection nozzle for dispersing the surfactant at the selected depths. In the preferred embodiment the infiltration operation will utilize approximately 200 gallons of the infiltration test surfactant. More preferably, the surfactant will be allowed to equilibrate with the static ground water elevation for a period of 12 to 48 hours. Alternatively, the approximate time may be chosen as a site specific variable which is assessed by examining hydrology and geology or lithology.

Alternatively, one skilled in the art will appreciate the infiltration operation may comprise a gravity feed method. The gravity feed method may employ the release of the infiltration test surfactant solution into an injection well from the holding tank 16 through a flow control valve over a "timed" interval. The injection well may be a permanent or monitoring well existing at the site. Preferably, a constant level of fluid is maintained above the well screened interval without overflowing. More preferably, flow rates are documented. One skilled in the art will appreciate a volume of 200 gallons to be sufficient for the infiltration test for wells less than 50 feet below ground surface. For efficiency purposes, the injection of the infiltration surfactant may be accomplished using gravity feed in available wells in addition to selected locations where the pressure injection described above is performed.

After the infiltration test surfactant is injected into the contaminated area 14, soil samples are obtained to analyze the flow of the infiltration test surfactant. A plurality of vertical soil borings are installed in the contaminated area 14. Preferably, the soil borings are installed at varying distances from the at least one injection rod. More preferably, the soil samples are taken at distances such as 1, 2, and 4 feet laterally, and at depths that exceed the intervals of injection of the infiltration test surfactant.

The plurality of soil samples are then analyzed for the presence of the injected surfactant. Preferably, the soil samples are viewed in normal light for signs of the infiltration test surfactant, and more preferably the fluorescent dye. The soil samples are also viewed under an ultraviolet light to view the presence of the dye in the surfactant. The ultraviolet light illuminates the soil which has been impacted by the fluid dye and is caused to fluoresce.

The presence of the infiltration test surfactant in the soil samples allows for the documentation of the thickness and lateral extent of surfactant dye impact. The extent of the dye impact from the injection tests allows for the calculation of flow volumes, flow rates, and flow paths of the surfactant. The visual inspection and observation of dye and dye traces described above is helpful to identify flow paths. Flow volume and rate is preferably verified using a monitored volume per unit time, determining how much volume of surfactant penetrated the area per unit of time. Alternatively, formulas and fluid mechanics such as hydraulic conductivity may be used to determine flow rates, volumes, and paths.

An effective Radius of Influence (ROI) for the fluid injection of a remediation surfactant may be determined using the data gathered from the analysis of the soil samples. A ROI allows for calculation of a remediation surfactant injection grid area. The grid area is preferably a three-dimensional projection spanning the contaminated area 14. More preferably, the injection grid is designed for placement vertically and horizontally across the impacted area utilizing the ROI and site lithology. The site soil porosity, ROI, and fluid flow rates may be used to determine the volume (gallons) to implement flushing the required pore volume(s) of the remediation surfactant through the continuing impacted source zone.

With the analysis of the infiltration operation complete, the remediation surfactant is injected into the contaminated area. The purpose of the remediation surfactant injection is to perform in situ surfactant washing, encapsulating liquid hydrocarbons in the subsurface contamination area. Preferably, the remediation surfactant comprises the same surfactant as that used in the infiltration operation, without the fluorescent dye. Using the same surfactant as that used in the infiltration operation is beneficial for achieving expected flow rates, flow paths, and flow volumes. More preferably, the surfactant comprises a water based biodegradable blended surfactant, although other surfactants are contemplated as well. Additionally, as with the infiltration operation, the remediation surfactant may be allowed to equilibrate with the static ground water elevation for a period of 12 to 48 hours, or a time period determined to be effective for the specific site composition. One skilled in the art will appreciate the use of the remediation surfactant in this process reduces surface tension and makes the liquid hydrocarbons more soluble and mobile in water. The more easily mobilized water and hydrocarbon phases may be transported and removed from the subsurface significantly easier than a dual phase extraction process alone.

The remediation surfactant is injected into the contaminated area based on the determined ROI. One skilled in the art will appreciate multiple injection points or multiple injections may be more effective for the remediation process. Preferably, the remediation surfactant is pressure injected using the injection system 10 used in the infiltration operation. More preferably, a plurality of direct push rods 20 and tooling are inserted into a plurality of temporarily placed grid injection points. The direct push tooling is preferably connected to a progressive cavity fluid pump 18 for the injection of the surfactant. Fluid flow is regulated by governing RPMs of the pump motor and valve opening arrangements. Most preferably, the pressure is regulated by a 400 psi in-line gauge. In an alternative embodiment, the remediation surfactant solution may be gravity fed into existing site wells through a series of valves and hoses connected to the holding tank 16. As with the infiltration operation, the use of existing wells may augment the injection of the surfactant at the selected locations where the pressure injection is performed to provide for more efficient injection of the remediation surfactant.

Figure 2:
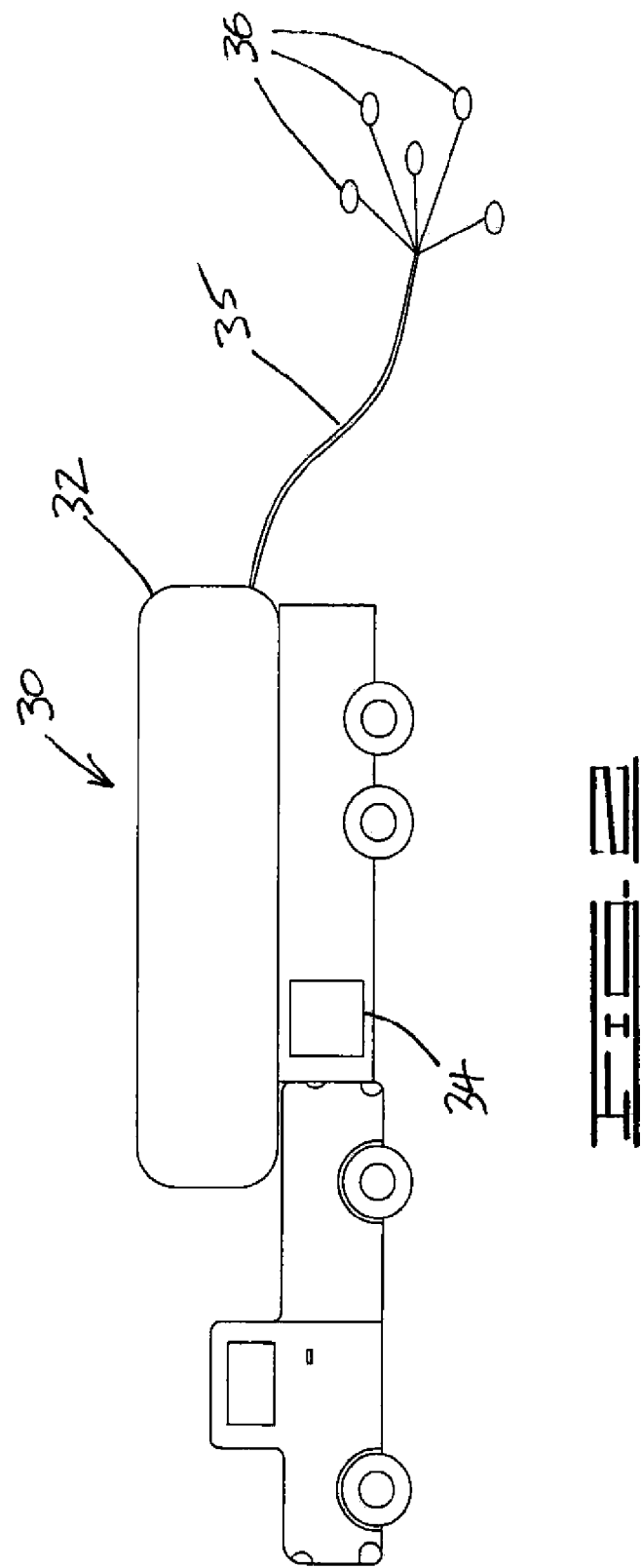
FIG. 2 is a graphical representation of a vacuum extraction system for use with the present invention.

After the remediation surfactant has been injected into the impacted or contaminated area 14, the contaminant can be extracted from the area. The purpose of the groundwater/free product extraction is to remove the now surfactant mobilized hydrocarbons. With reference now to FIG. 2, there is shown therein a mobile high vacuum extraction system 30 for use with the present invention. The vacuum extraction system 30 is positioned and maintained proximate a plurality of recovery wells 36. Preferably, the system 30 comprises a holding tank 32, a vacuum pump 34, and a plurality of hoses 35 to connect the pump and holding tank to the plurality of recovery wells 36. The pump 34 preferably comprises a liquid ring pump.

The plurality of recovery wells 36 are initially opened to allow the groundwater to equilibrate with static barometric pressure. Preferably, the wells 36 are gauged with an oil/water interface probe for determine depth to the contaminant and depth to ground water. More preferably, no more than six or seven wells 36 are extracted at one time depending on the amount of water column present in each well.

Referring now to FIG. 3, well-head seals 38 are placed on the wells 36 to be vacuum extracted. Preferably, the well-head seal 38 comprises a cap 40 for creating an air-tight seal on the well 36. Bolts or other means may be provided on the cap 40 to allow the cap to be secured to the well 36 and create the seal for a vacuum. The cap 40 comprises a port 42 for a vacuum tube 44 that is connectable to one of the hoses 35. The cap 40 may also comprise a second port 46 for pressure gauges or other ports and gauges as needed for monitoring the extraction operation.

The vacuum tube 44 is preferably comprised of flexible tubing for insertion into the well 36. More preferably, the tubing 44 is one-inch diameter tubing. Most preferably, the tubing 44 is clear to allow for viewing of fluid passing through the tubing during the extraction process.

In the preferred embodiment, the flexible tubing 44 is inserted through the port 42 in the cap 40, to a predetermined depth just above the fluid level in the well 36. A vacuum gauge 48 is preferably connected to the port 46 and the vacuum on the well 36 noted. The tubing 44 is then lowered into the well 36 in approximately one-foot increments. One skilled in the art will appreciate the need to maintain the vacuum on the well 36 by monitoring the fluid level. The tubing 44 is lowered in order to maintain the vacuum pressure substantially within a predetermined range. Preferably, the vacuum gauge 48 should read approximately 20 psi or greater. The process of lowering the tubing 44 may be repeated, as fluid is extracted and pressure changes dictate, to the predetermined bottom of the contaminated area 14, or alternatively to near the total depth of the well 36.

The procedure of lowering the tubing 44 is repeated for each well 36. Preferably, this pressure level is maintained for the duration of the extraction event. One skilled in the art will appreciate additional measures for ensuring proper extraction, including monitoring and recording exhaust gasses at the vacuum pump 34 using an organic vapor analyzer periodically through the extraction event. Laboratory samples may also be taken from gauges at the vacuum pump 34 using vapor sample bags at periodic intervals.

Various modifications can be made in the design and operation of the present invention without departing from its spirit. Thus, while the principal preferred construction and modes of operation of the invention have been explained in what is now considered to represent its best embodiments, it should be understood that within the scope of the appended claims, the invention may be practiced otherwise than as specifically illustrated and described.

The invention claimed is:

1. A method for remediation of a contaminated subsurface area, the method comprising:
   injecting an infiltration test surfactant at least one infiltration location in the contaminated area;
   obtaining a plurality of soil samples from a plurality of locations in the contaminated area;
   analyzing the plurality of soil samples for the presence of the injected surfactant; and
   determining a radius of influence of the injected surfactant;
   injecting a remediation surfactant into the contaminated area;
   wherein the step of injecting the remediation surfactant is performed based on the determined radius of influence;
   installing a well-head cap seal on a recovery well, the well-head cap seal comprising:
      a cap adapted to be secured to the well, the cap defining a port; and
      a tubing adapted to be inserted through the port;
      wherein the tubing is adapted to be inserted to a predetermined depth in the well when the cap is secured to the well; and
   extracting a contaminant from the contaminated area using a vacuum extraction system, the vacuum extraction system comprising,
      a holding tank;
      a pump;
      at least one hose connected to the holding tank and adapted to be connectable to the tubing of the well-head cap seal;
   moving the tubing to a second predetermined depth in the well to maintain a vacuum pressure within a predetermined range.

2. The method of claim 1 wherein the infiltration test surfactant comprises a fluoresceine dye.

3. The method of claim 2 wherein the step of injecting the infiltration test surfactant comprises pressure injecting the surfactant.

4. The method of claim 2 wherein the step of injecting the infiltration test surfactant comprises injecting the infiltration test surfactant at a plurality of depths in the contaminated area.

5. The method of claim 1 wherein the plurality of locations in the step of obtaining a plurality of soil samples comprise locations that represent different distances from the at least one infiltration location.

6. The method of claim 1 wherein the step of analyzing the soil samples comprises viewing the samples under normal light.

7. The method of claim 1 wherein the step of analyzing the soil samples comprises viewing the samples under ultraviolet light.

8. The method of claim 1 wherein the step of determining a radius of influence comprises calculating a flow path of the infiltration test surfactant.

9. The method of claim 1 wherein the step of determining a radius of influence comprises calculating a flow volume of the infiltration test surfactant.

10. The method of claim 1 wherein the step of determining a radius of influence comprises calculating a flow rate of the infiltration test surfactant.

11. The method of claim 1 wherein the step of injecting a remediation surfactant comprises pressure injecting the surfactant.

12. The method of claim 11 wherein the remediation surfactant comprises a water based biodegradable blended surfactant.

13. The method of claim 11 wherein the step of extracting the contaminant comprises using the vacuum extraction system at a plurality of well heads.

14. The method of 1 further comprising the steps of:
   measuring a vacuum pressure in the well at a point above a level of groundwater in the well; and
   measuring a vacuum pressure in the well at the predetermined depth in the well.

15. The method of claim 1 wherein the tubing can be moved to the second depth in the well without removing the cap.

16. The method of claim 1 wherein the cap defines a second port and further comprising a pressure gauge connectable to the second port.

* * * * *